United States Patent
Mende et al.

(10) Patent No.: US 6,953,416 B2
(45) Date of Patent: Oct. 11, 2005

(54) TRAVELING GEAR FOR AN AGRICULTURAL WORKING MACHINE

(75) Inventors: Ingo Mende, Dresden (DE); Henri Scholtke, Obergurig (DE)

(73) Assignee: CNH America LLC, Racine, WI (US)

( * ) Notice: Subject to any disclaimer, the term of this patent is extended or adjusted under 35 U.S.C. 154(b) by 8 days.

(21) Appl. No.: 10/405,428

(22) Filed: Apr. 2, 2003

(65) Prior Publication Data

US 2004/0023756 A1 Feb. 5, 2004

(30) Foreign Application Priority Data

Apr. 3, 2002 (DE) .......................................... 102 14 598

(51) Int. Cl.[7] .............................................. B60K 41/04
(52) U.S. Cl. ....................................... 477/107; 74/733.1
(58) Field of Search .............................. 74/730.1, 731.1, 74/732.1, 733.1; 477/107

(56) References Cited

U.S. PATENT DOCUMENTS

| | | | | |
|---|---|---|---|---|
| 4,606,313 A | * | 8/1986 | Izumi et al. | 123/386 |
| 4,769,774 A | * | 9/1988 | Narita et al. | 701/54 |
| 5,890,468 A | * | 4/1999 | Ozawa | 123/561 |
| 6,202,783 B1 | * | 3/2001 | Taylor et al. | 180/305 |

FOREIGN PATENT DOCUMENTS

JP 01-116371 * 5/1989 .................. 60/490

* cited by examiner

*Primary Examiner*—Ha Ho
(74) *Attorney, Agent, or Firm*—Rebecca Henkel; Brant T. Maurer

(57) ABSTRACT

A traveling gear for an agricultural working machine configured to adjust an engine speed so as to control the traveling speed of the agricultural working machine for road travel. The traveling gear generally controls the traveling speed of the machine by controlling a central driving gear. The traveling gear generally includes a diesel engine as its central motive power source, a variable displacement pump driven by the diesel engine, an electro-hydraulic motor with an adjustable induction volume, and a pair of electro-hydraulic motors which are switchable in their induction volume. For a change in speed, the displacement volume of the variable displacement pump is adjusted. The change in displacement of the variable displacement pump causes a change in speed of the electro-hydraulic motors, which in turn causes a corresponding change in speed of the traveling gear and associated traveling speed of the agricultural machine.

6 Claims, 1 Drawing Sheet

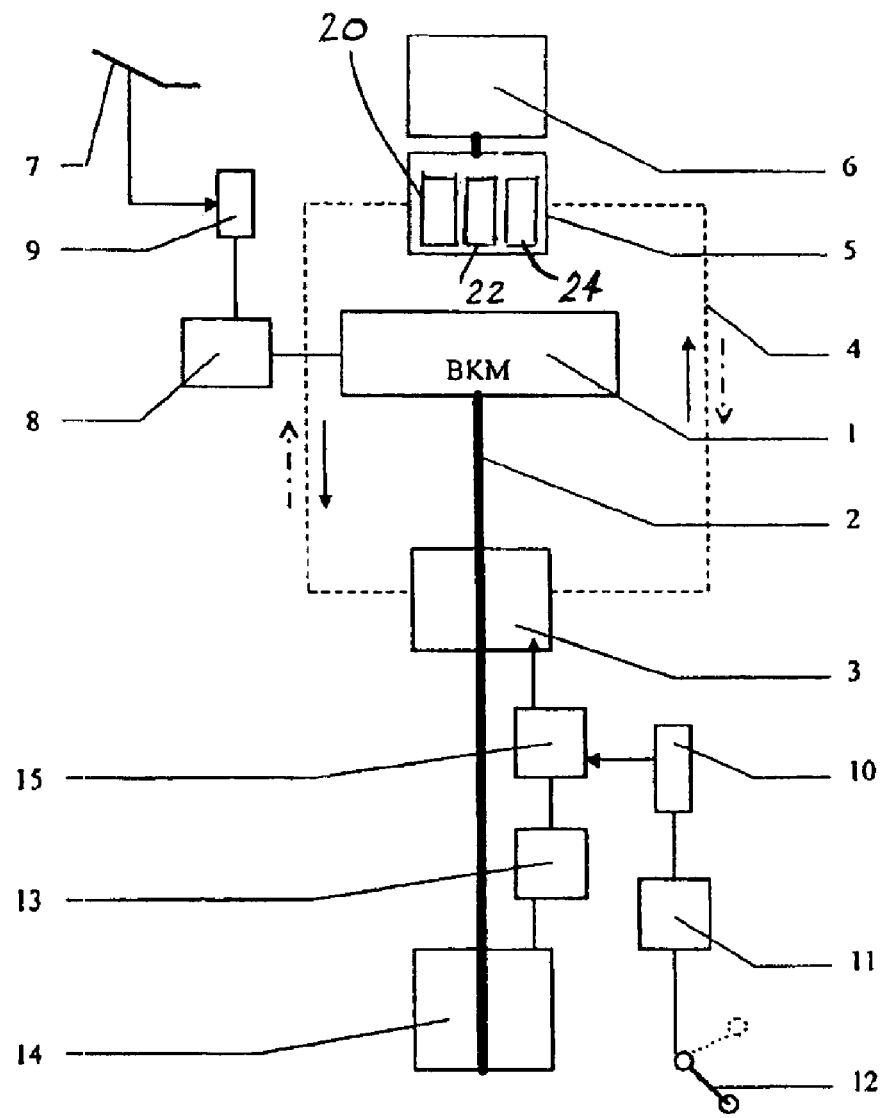

ive jet and the leakage oil of the axial piston machine, as well as the feed for the control pressures. Additionally, a cooling and cleaning flow is produced in the closed circuit. The control pressure for the pump control system stands under a higher pressure than the feed pressure.

TRAVELING GEAR FOR AN AGRICULTURAL WORKING MACHINE

FIELD OF INVENTION

The invention concerns a travelling gear for an agricultural working machine, in particular for a self-propelled harvesting machine, with control of the travelling speed by adjusting the engine speed to the planned driving for road travel.

BACKGROUND OF THE INVENTION

From the published application for a patent DE 199 21 697 A1 a procedure and a device for setting the engine speed on a driving engine on a working machine is known, which is characterised by the application of a set value for the travelling speed for transportation or road travel for setting the engine speed. This setting of the engine speed takes place according to the position of a throttle lever, which sets the travelling speed of the working machine. An automatic transmission holds this preset travelling speed under heavier loading of the machine by regulating the power of the driving engine. A change of speed is obtained by moving the throttle lever. For this a hand must be removed from the steering wheel. Forwards and backwards travel and the speed are selected with the throttle lever, which controls the variable displacement pump mechanically or via an electronic device.

SUMMARY OF INVENTION

The task of the invention is to find a travelling gear for an agricultural working machine with control of the speed for road travel by controlling the central driving gear.

In the case of a travelling gear in accordance with the invention for an agricultural working machine with control of the travelling speed when driving on roads with a diesel engine as the central source of power, a variable displacement pump and at least one hydraulic motor, the delivery volume of the variable displacement pump and with it the travelling speed when driving on the road are dependent upon the current position of an accelerator pedal. The speed of the diesel engine is controlled by an electronic accelerator pedal.

The travelling gear has a diesel engine as its central motive power source for all the working processes of the machine, a variable displacement pump, the delivery volume of which is adjustable electrically, driven by the diesel engine, an electro hydraulic motor which has an adjustable induction volume and two electro hydraulic motors which are switchable in their induction volume. The control range of the diesel engine begins at a very low idling speed of 500 rpm. The desired travel forwards or backwards is determined by moving the throttle lever. If the speed of the diesel engine is increased by operating the accelerator pedal, the change in speed is measured electronically with a speed sensor. It can also be measured hydraulically via a jet combination in the variable displacement pump.

If a certain dead range, which gives security against unwanted transport movement, above the idling speed is exceeded, the delivery volume of the variable displacement pump is increased in accordance with the measured change in speed and the harvesting machine travels according to the position of the throttle lever. If the speed is lowered by operating the accelerator pedal, the displacement volume of the variable displacement pump is reduced in accordance with the measured speed. Thus a speed is produced always in accordance with the accelerator pedal position. Through the sequential change in displacement of the variable displacement pump from small to large delivery volumes and the displacement of the motor from large to small induction volumes there arises a correspondingly large transformation range of torque and travelling speed.

The adjusting motor is automatically regulated by means of an internal pressure measurement from an adjustable pressure to a large induction volume, in order to achieve high moments when accelerating. According to the selected speed range, the two switchable motors are switched to a small or large induction volume. Acceleration of the vehicle can be determined through the control electronics or by changing of the jet combination depending upon the vehicle mass and requirements. Deceleration of the travelling gear takes place by reducing the speed of the diesel engine, as a result of which the variable displacement pump is swung back in the direction of a minimum induction volume (through the measured change in speed) and the vehicle is braked. While doing so, the driver can keep both hands on the steering wheel and he no longer needs to operate the throttle lever. If the vehicle is braked down to idling speed in this manner, also no unwanted transport movement can occur through deflection of the throttle lever.

BRIEF DESCRIPTION OF THE DRAWINGS

The invention will now be described further, by way of example, with reference to the accompanying drawing, in that:

FIG. 1 is a block circuit diagram of the travelling gear for an agricultural working machine.

DETAILED DESCRIPTION OF THE PREFERRED EMBODIMENT

On a diesel engine (1) serving as a central motive power source for the agricultural working machine, a variable displacement pump (3) is tightly coupled to it via a central shaft (2). To the variable displacement pump (3), a hydraulic motor (5) is connected via a hydraulic line (4), which is followed by a running gear (6). The speed of the diesel engine (1) is adjusted either directly via an accelerator pedal (7) with a Bowden cable provided with a return spring or through an interposed engine electronic system (8). Setting of the speed of the diesel engine (1) is effected via the accelerator pedal (7). A potentiometer (9) coupled with the accelerator pedal (7) serves for producing an electric signal corresponding to the instantaneous position of the accelerator pedal (7), which is transmitted as a proportional position signal to the injection pump of the diesel engine (1) or is used for driving an engine electronic system. Thus, the speed of the diesel engine (1) is not prescribed rigidly, but is determined by the instantaneous position of the accelerator pedal (7). As the variable displacement pump (3) of the hydraulic motor (5) is tightly coupled to the diesel engine (1), it is driven by it at a prescribed ration to the speed of the diesel engine (1). The forwards or backwards travel of the running gear (6) is set by the variable displacement pump (3) by means of a direction of travel valve (10) (forwards/backwards). This direction of travel valve (10) serves during road operation only for setting forwards or backwards travel and the maximum traveling speed. The direction of travel valve (10) is actuated via a throttle lever (11). While doing so, a control electronics system (12) remains in its starting position. The variable displacement pump (3) is subordinated to a pump control system, to which a control valve (13) and a feed pump (14) are connected in series. The feed pump (14) is built directly onto the variable displacement pump (3) or is built into it and is driven by it with a 1:1 ratio. It serves for feeding into the low-pressure side the measurement for the speed of the variable displacement pump (3) and for supplying a pump regulator (15) with control oil. The delivery stream is proportional to the speed of the diesel engine (1) and hence it represents the variable parameter (command signal for the pump control.

The hydraulic control valve (13) is a combination of diaphragms, springs and regulating pistons. It serves for processing the volume flow (speed value) delivered by the feed pump (14) proportional to its speed into a corresponding control pressure, which is fed to the pump regulator (15). The pressure difference, which is produced in proportion to the volume flow delivered by the feed pump (14), results in a force on the regulating piston, which for its part opens the cross-section to the control line and thus builds up a control pressure, which is used for pump regulation and which at the same time produces high pressure in the circuit of the traveling gear. Through the selection of the diaphragms the characteristic curve of the control valve (13) can be adjusted and with it that of the traveling gear. The combination of diaphragms is so selected that when the diesel engine (1) is at idling speed no build up of control pressure occurs. Only on reaching a predetermined speed does the control valve (13) open. The variable displacement pump (3) begins to swing out. If the speed of the diesel engine (1) is raised further, a proportional excursion of the variable displacement pump (3) occurs. The speed, at which the control pressure attains a maximum value and the variable displacement pump (3) is fully swung out, can be selected according to the desired characteristic curve. The characteristic curve for swinging out is determined by an increase in the speed of the diesel engine (1) and by raising the control pressure. Both of these lead to an increase in speed of the hydraulic motor (5) on the power take-off side and hence to an increase in traveling speed.

In principle the reverse of this applies to an adjustment from a high to a lower speed. With the accelerator pedal (7), a reduction in the speed of the diesel engine (1) is prescribed. The delivery volume of the feed pump (14) falls in proportion with the speed. A smaller volume flows through the control valve (134), which for its part produces a smaller pressure drop. The control pressure, which is fed to the pump regulator (15), is reduced and the variable displacement pump (3) swings in proportionally to the speed of the diesel engine (1) in the said manner. If the speed of the diesel engine (1) is reduced to idling speed, the variable displacement pump (3) swings fully in and the hydraulic motor (5) is braked down to a standstill on the power take-off side.

With the accelerator pedal (7), the facility thus exists to run up to any desired speed within a range and to transfer to an appropriate traveling speed. Accelerating and decelerating of the traveling gear for an agricultural working machine is controlled only via the accelerator pedal (7), through which the otherwise usual operation by means of the throttle lever (11) is omitted. Operation with the accelerator pedal (7) permits a considerably more measured and planned mode of driving. In addition, the driver is freed from operation of the throttle lever (11) and thus he has both hands free for operating the steering.

It will be appreciated that, although the invention has been described with reference to a particular type of agricultural working machine, still other embodiments can be thought of without departing from the original idea of the invention as defined by the claims.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A travelling gear for an agricultural working machine with control of the travelling speed when running on roads with a diesel engine as the central source of motive power, a variable displacement pump and at least one hydraulic motor, in which the delivery volume of the variable displacement pump and hence the travelling speed when running on the road is dependent upon the current position of an accelerator pedal, and the travelling gear comprising of the variable displacement pump adjustable as regards its delivery volume, connected so as to be driven by the diesel engine, the at least one hydraulic motor including a first electro-hydraulic motor with adjustable induction volume and a second and a third electro-hydraulic motor with switchable induction volumes, characterised in that, the speed of the diesel engine is controllable via the electronic accelerator pedal and the change in speed is measured electronically with a speed sensor and the delivery volume of the variable displacement pump is increased or diminished according to the measured speed.

2. A travelling gear for an agricultural working machine in accordance with claim 1, characterised in that, forwards and backwards travel is determined through the full excursion of a throttle lever.

3. A travelling gear for an agricultural working machine in accordance with claim 1, characterised in that, the change in speed is measured hydraulically in proportion to a change in feed volume of oil from a feed pump to the variable displacement pump and the delivery volume of the variable displacement pump is increased or diminished in accordance with the measured speed.

4. A travelling gear for an agricultural working machine in accordance with claim 1, characterised in that, the first electro-hydraulic motor is adjusted automatically via an internal pressure measurement from an adjustable pressure to a greater induction volume.

5. A travelling gear for an agricultural working machine in accordance with claim 1, characterised in that, the second and third electro-hydraulic motors are switched to a small or large induction volume according to a selected speed range.

6. A travelling gear for an agricultural working machine, comprising:
   a diesel engine as the central source of motive power;
   an accelerator pedal having a detected position that determines a speed of the diesel engine;
   a variable displacement pump having an adjustable delivery volume dependent, the variable displacement pump connected so as to be driven by the diesel engine; and
   at least one electro-hydraulic motor connected via a hydraulic line with the variable displacement pump,
wherein the delivery volume of the variable displacement pump to the at least one electro-hydraulic motor is increased or diminished according to the measured speed of the diesel engines;
wherein the at least one electro-hydraulic motor includes a first electro-hydraulic motor with an adjustable induction volume and a second and a third electro-hydraulic motor that are each switchable between a small and a large induction volume.

* * * * *